United States Patent
Tsuchiya et al.

[11] Patent Number: 5,423,016
[45] Date of Patent: Jun. 6, 1995

[54] BLOCK BUFFER FOR INSTRUCTION/OPERAND CACHES

[75] Inventors: Kenichi Tsuchiya, New Brighton; Lewis A. Boone, Fridley; Michael L. Haupt, Roseville, all of Minn.; Thomas Adelmeyer, Hillsboro, Oreg.

[73] Assignee: Unisys Corporation, Blue Bell, Pa.

[21] Appl. No.: 840,464

[22] Filed: Feb. 24, 1992

[51] Int. Cl.$^6$ .............................. G06F 13/00
[52] U.S. Cl. ...................... 395/425; 395/375
[58] Field of Search ............. 395/400, 425, 375

[56] References Cited

U.S. PATENT DOCUMENTS

| | | | |
|---|---|---|---|
| 3,806,888 | 4/1974 | Brickman et al. | 395/425 |
| 4,189,770 | 2/1980 | Gannon et al. | 395/425 |
| 4,189,772 | 2/1980 | Liptay | 364/200 |
| 4,225,922 | 10/1980 | Porter | 364/200 |
| 4,354,232 | 10/1982 | Ryan | 364/200 |
| 4,433,374 | 2/1984 | Hanson et al. | 395/425 |
| 4,437,149 | 3/1984 | Pomerene et al. | 364/200 |
| 4,646,233 | 2/1987 | Weatherford et al. | 395/425 |
| 4,851,993 | 7/1989 | Chen et al. | 395/250 |
| 4,888,679 | 12/1989 | Fossum et al. | 364/200 |
| 4,905,188 | 2/1990 | Chuang et al. | 364/900 |
| 5,023,776 | 6/1991 | Gregor | 364/200 |
| 5,025,366 | 6/1991 | Baror | 364/200 |
| 5,027,270 | 6/1991 | Riordan et al. | 364/200 |
| 5,201,041 | 4/1993 | Bohner et al. | 395/425 |
| 5,202,972 | 4/1993 | Gusefski et al. | 395/425 |
| 5,247,639 | 9/1993 | Yamahata | 395/425 |
| 5,261,066 | 11/1993 | Jouppi et al. | 395/425 |

*Primary Examiner*—Jack B. Harvey
*Assistant Examiner*—Jack A. Lane
*Attorney, Agent, or Firm*—Nawrocki, Rooney & Sivertson

[57] ABSTRACT

A method of and apparatus for efficiently transferring data between a memory system and an instruction processor having a dedicated cache memory. A read request within the instruction processor for a data element not currently stored within the dedicated cache memory creates a read cache miss condition. A transfer of the eight word block containing the requested data element is initiated from the memory system beginning with the 72 bit double word containing the requested data element. The eight word block of data is placed into a block buffer upon being received by the instruction processor. The instruction processor is permitted to resume instruction execution and access to the cache memory as soon as the requested data element has been received by the block buffer. The eight word data block is transferred from the block buffer to cache memory at the next read cache miss condition. The block buffer has a no save designator for block transfers and other accesses for which near term subsequent access to buffered data is unlikely. Data designated no save is not transferred from the block buffer to the cache memory.

14 Claims, 6 Drawing Sheets

BLOCK BUFFER FOR INSTRUCTION/OPERAND CACHES

CROSS REFERENCE TO CO-PENDING APPLICATIONS

The present application is related to U.S. patent application Ser. No. 07/762,282, filed Sep. 19, 1991, now abandoned, entitled "Cooperative Hardware and Microcode Control System for Pipelined Instruction Execution", and U.S. patent application Ser. No. 07/762,276, filed Sep. 19, 1991, now abandoned, entitled "Data Coherency Protocol for Multi-Level Cached High Performance Multiprocessor System", both assigned to the assignee of the present invention and both incorporated herein by reference.

BACKGROUND OF THE INVENTION

1. Field of the Invention

The present invention relates generally to data processing systems and more particularly relates to data processing systems employing cache memory.

2. Description of the Prior Art

It has been shown that the use of a small high speed memory, often called a cache memory, between an instruction processor and the much slower main memory tends to enhance performance. Instructions and data present within the cache memory at the time of requested access by the instruction processor are furnished much more quickly than those instructions and data which must be obtained from main memory.

To obtain maximum benefit from the use of a cache memory, it is desirable to anticipate which memory locations will be accessed by the instruction processor so that they may be preloaded into the cache memory. U.S. Pat. No. 3,806,888 issued to Brickman et al, shows an early data processing system employing a cache memory between the main memory (i.e. backing store) and the instruction processor (i.e. central processing unit). In this system, real memory is segmented into blocks or pages. If the instruction processor requests access to one data element of a block, the entire block is automatically transferred to the cache memory for subsequent use by the instruction processor. U.S. Pat. No. 4,225,922 issued to Porter attempts to improve upon the basic cache approach by segmenting the cache memory and by buffering cache commands. U.S. Pat. No. 4,354,232 issued to Ryan also buffers cache control commands.

The prefetching of data may be further complicated by variable length elements. U.S. Pat. No. 4,189,772 issued to Liptay attempts to address this problem by buffering the input to the cache memory. A decoder element is added by U.S. Pat. No. 4,437,149 issued to Pomerene et al, between the main memory and the cache memory to partially decode instructions before complete loading of the cache memory.

The cache memory and cache controller are placed on the same substrate in U.S. Pat. No. 5,025,366 issued to Baror. U.S. Pat. No. 4,905,188 issued to Chuang et al, describes a chip design for optimization of the hardware construction.

A multiprocessor system is shown in U.S. Pat. No. 5,023,776 issued to Gregor. The individual instruction processors have dedicated (i.e. L1) cache memories. Shared (i.e. L2) cache memories are interposed between the dedicated cache memories and the main (i.e. L3) memory. Write buffers are employed in parallel with the L2 caches. Multiple sequential writes bypass the L2 cache and proceed directly to the L3 memory through the write buffers.

In each of the prior art approaches, however, prefetching of the correct data continues to be a problem, along with the delay associated with the transfer of the prefetched data into the cache memory. A further problem is the difficulty in holding the instruction processor for a period of time necessary to preload the entire block of data containing the requested data element.

SUMMARY OF THE INVENTION

The present invention overcomes the problems found in the prior art by providing a method of and apparatus for efficiently prefetching data elements to be subsequently accessed by an instruction processor and storing these data elements in a block buffer before loading them into the cache memory.

In the preferred embodiment of the present invention, each instruction processor has two dedicated cache memories. One of the cache memories is used only for instructions and the other is used only for operands. Each of these cache memories interface directly with second level shared cache memories which are associated with particular main memory modules. The instruction cache memory is utilized by the instruction processor in the read mode only, whereas the instruction processor both reads from and writes into the operand cache memory.

A read access request to either the instruction or operand cache memory when the cache does not have the requested data element results in a "cache miss" condition. As a result, the access request is made of the corresponding second level shared cache and ultimately the main memory module if necessary. According to the present invention, the block of eight words containing the requested data element is loaded into a block buffer rather than directly into the corresponding cache memory. This load is accomplished beginning from the requested address first. As soon as the requested data element has been loaded into the block buffer, it is made available to the instruction processor. In this way, the instruction processor is permitted to proceed executing subsequent instructions in parallel with loading of the remainder of the requested block of data into the block buffer. The subsequent instructions are able to obtain data from the cache memory because the cache memory is not busy storing the requested block.

The block of data which is first loaded into the block buffer is transferred into the corresponding dedicated instruction or operand cache memory using a least frequently used replacement algorithm upon occurrence of the next cache miss condition of the instruction processor. This transfer is necessary to free the block buffer for the newly requested data block and totally overlaps the subsequent cache miss condition, thereby preventing a degradation of performance. If the block of data within the block buffer is accessed again before the next cache miss condition, the access request is serviced directly from the block buffer. In this way, the instruction processor need not be disturbed by a second cache miss data request if the requested data is in the block buffer, and no additional time is consumed to perform the block buffer to cache memory block transfer.

The operand block buffer has a write/no write function which greatly facilitates certain instruction processor functions, such as block transfers, dayclock reads, accelerate General Register Set (GRS), etc. By not saving the no save block data in operand cache, the contents of the cache need not be disturbed by writing data into it which are not likely to be accessed soon.

The present invention provides performance enhancements upon read access to cache miss data by buffering the cache miss data block beginning with the requested address. This makes the requested data element available to the instruction processor at the earliest possible time and permits instruction execution to proceed without the need to first preload other data elements within the cache miss data block. Furthermore, no data block within the associated cache memory is replaced until the second cache miss data block is actually accessed, permitting overlap of the block buffer to cache memory transfer. Second read accesses to the data block within the block buffer do not result in cache memory replacement, until another cache miss condition occurs.

Specialized write accesses to the operand block buffer do not result in cache replacement if the associated instruction has no save set, because subsequent near term access to the data is unlikely, as occurs with block transfers, for example. The data read operations for those instructions in effect by-pass the operand cache by flagging the corresponding operand cache buffer entries as "no save".

The additional advantage of the block buffer is that the instruction processor will be able to keep operating with acceptable performance even if an entire instruction processor cache memory is degraded due to soft/hard failures in the cache random access memory (RAM) cells.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
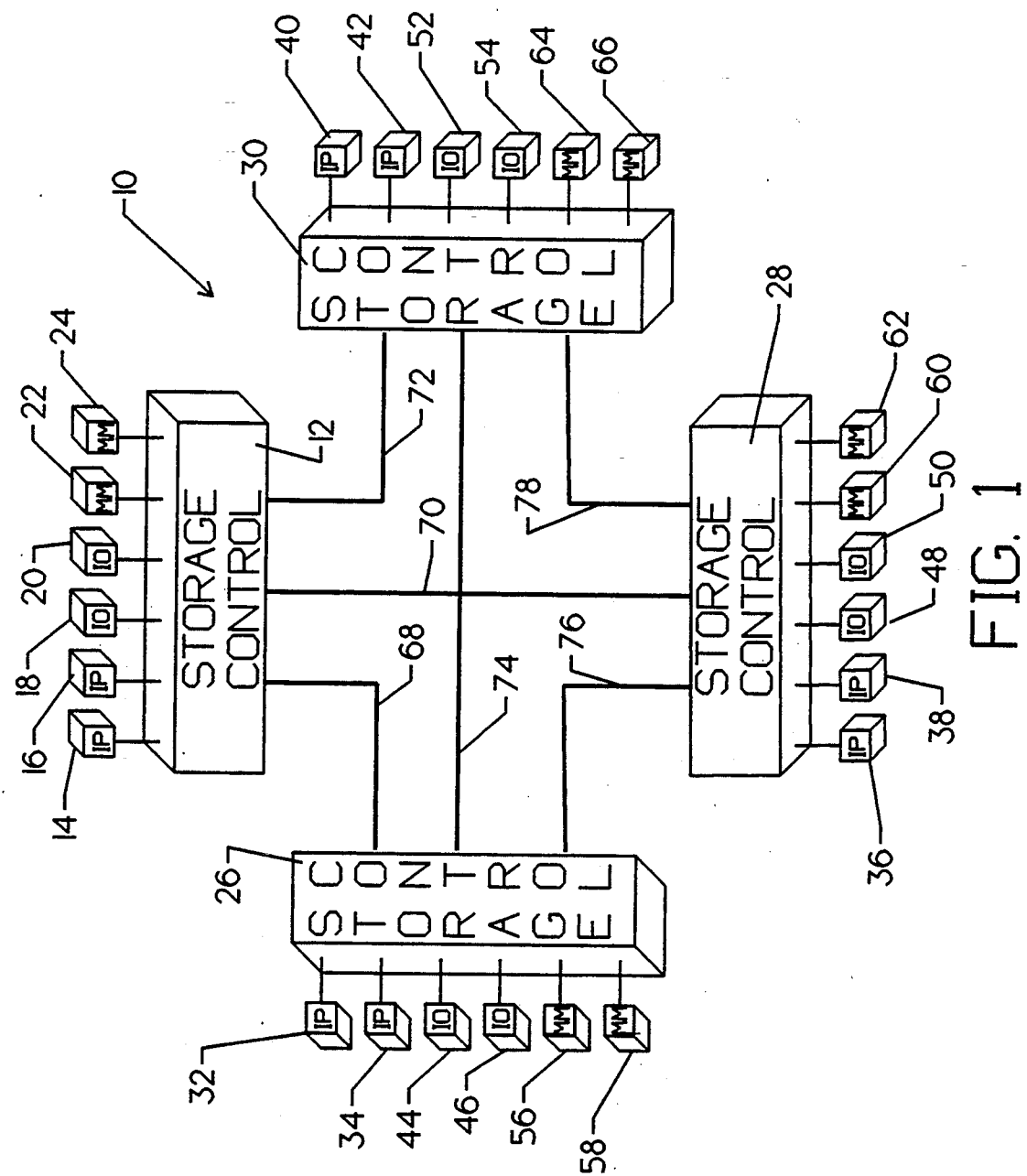
FIG. 1 is a block diagram of a fully populated system in accordance with the present invention.

FIG. 1 is an overall diagram of fully populated data processing system 10 according to the present invention. Data processing system 10 includes four individual processing clusters, each having its own storage controller and each having point-to-point communication with the other clusters via a storage controller to storage controller interface.

Storage controller 12 is coupled to storage controller 26 via interface 68. Similarly, storage controller 12 is coupled to storage controller 28 via interface 70 and to storage controller 30 via interface 72. Storage controller 26 communicates with storage controller 28 via interface 76 and to storage controller 30 via interface 74. In similar fashion, storage controller 28 and storage controller 30 are coupled via interface 78.

Storage controller 12 is fully populated with instruction processor 14, instruction processor 16, input/output processor 18, input/output processor 20, main memory module 22 and main memory module 24. Each of instruction processors 14 and 16 (along with similar instruction processors 32, 34, 36, 38, 40, and 42) has internal dedicated cache resources in the form of an instruction cache and an operand cache. These elements, along with the associated data invalidity logic, are described in more detail below. A more general description of the construction and operation of instruction processors 14 and 16 may be found in the above referenced and commonly assigned co-pending U.S. Patent Application which has been incorporated by reference.

Input/output processors 18 and 20, along with main memory modules 22 and 24, may be elements currently available, such as found in the Unisys Model 2200/600 series. Input/output processors 44, 46, 48, 50, 52, and 54 and main memory modules 56, 58, 60, 62, 64, and 66 may be similarly found.

Figure 2:
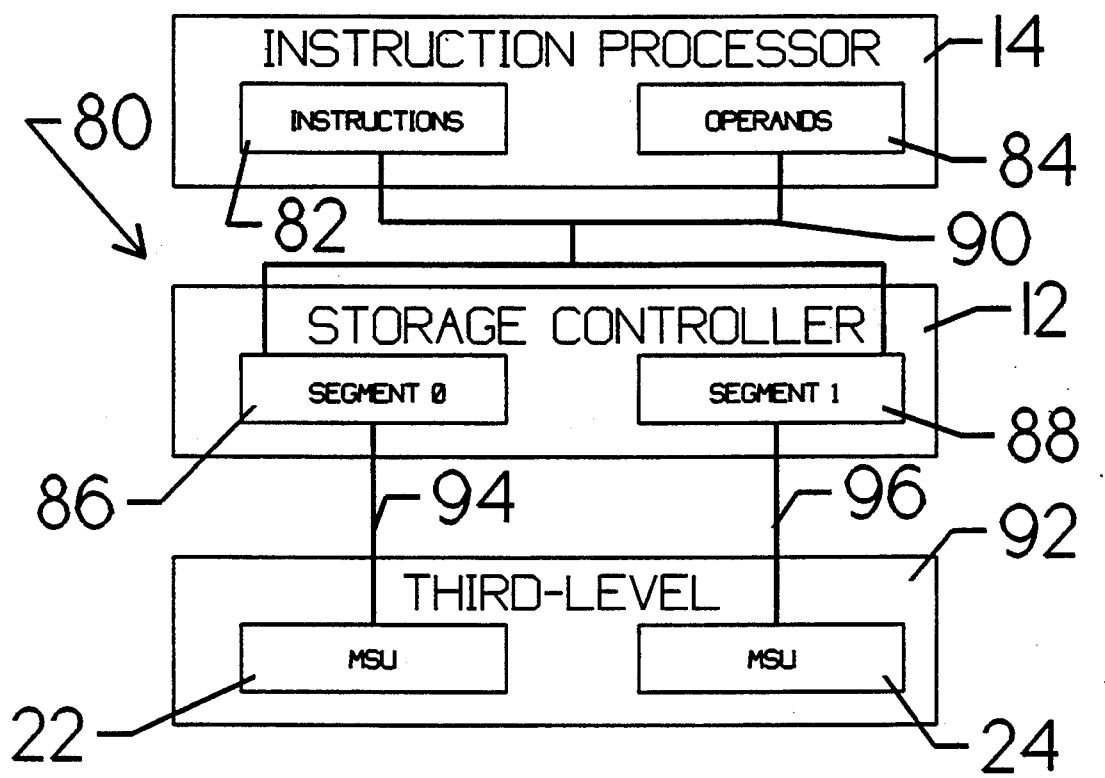
FIG. 2 is a schematic flow diagram of the memory hierarchy.

FIG. 2 is a flow diagram 80 showing the hierarchical arrangement of the three levels of memory of data processing system 10. Instruction processor 14 contains an instruction cache 82 and an operand cache 84, each storing 8 k of 36 bit words. These are internal to instruction processor 14 and dedicated to the operations undertaken therein. By partitioning the internal dedicated cache resources in this manner, there is a certain concurrence of cache accesses associated with normal instruction execution. Not shown for clarity are the instruction and operand cache buffers each containing one eight word block of 36 bit words. These are described in detail below.

Upon the request of instruction processor 14 to access a particular data element as either an instruction or operand, the directory of instruction cache 82 or operand cache 84 (and the associated block buffer), respectively, is queried to determine if the required data element is present within the associated cache resource. If the data element is present and valid, the access is completed at that level. If not, access is made to storage controller 12 via interface 90 for the block of eight 36 bit words containing the desired data element. A more detailed explanation of the operation of instruction cache 82 and operand cache 84 is found below.

Storage controller 12 contains a second level cache segment of 128 k 36 bit words for each for each main memory module within the cluster. In the present illustration, storage controller 12 contains segment 0 cache 86 and segment 1 cache 88. These cache resources are shared by all users of the main memory within the cluster to include both local and remote users. Any memory request to storage controller 12 is routed to the appropriate directory of segment 0 cache 86 or segment 1 cache 88 to determine if the desired data element is present and valid. This routing is based upon the address requested, since the intermediate cache resources are partitioned in address space to correspond to the associated main memory module.

If present and valid, the requested data element is supplied as an eight word block. If the requested data element is not validly present in segment 0 86 or segment 1 88 (depending upon the requested address), the data is requested from third level storage 92 containing main memory modules 22 and 24 via interfaces 94 and 96, respectively. In the preferred mode, main memory modules 22 and 24 each contain 64 meg. words of storage.

Each data element request to storage controller 12 is made through a separate interface. For a fully populated system, this includes two instruction processors, two input/output processors, and three other storage controllers (see also FIG. 1). Each data element request is divided between segment 0 cache 86 and segment 1 cache 88 based upon requested address. Only if the requested data element is not validly present in the appropriate intermediate level cache resource is an access request made to third level 92.

Figure 3:
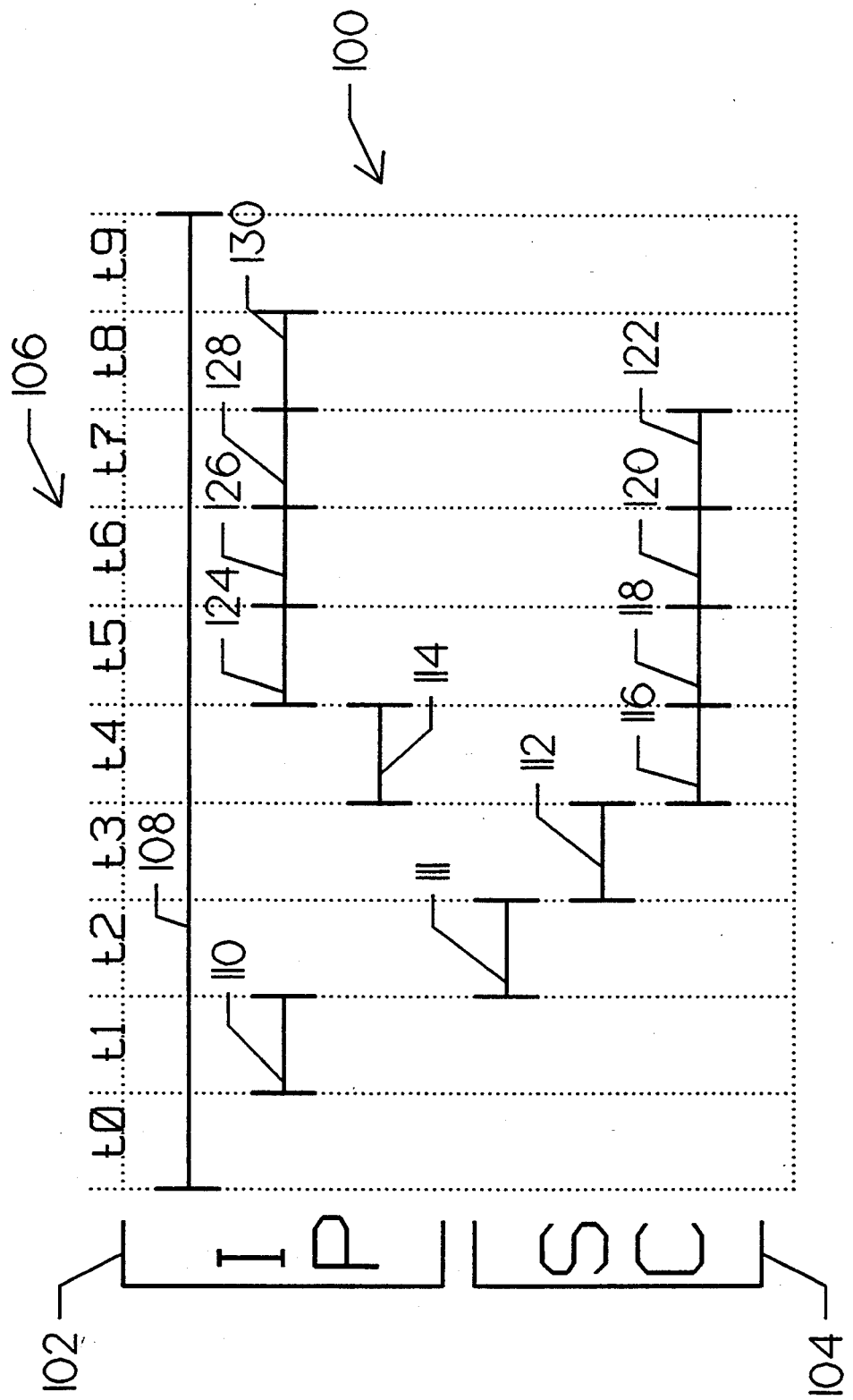
FIG. 3 is a timing diagram for a typical cache miss condition.

FIG. 3 is a timing diagram 100 showing execution of an instruction under a cache miss condition. Time scale 106 shows the various time intervals as determined by the internal instruction processor clock. Bracket 102 indicates a number of the significant instruction processor functions. Similarly, the significant storage controller functions are indicated by bracket 104.

Time line 108 is the instruction processor time line for execution of an instruction involving a cache miss. The address is formulated during time t0. After determining that the requested data element is not resident within the cache resources of the instruction processor, a read request is made to the storage controller at time line 110. The storage controller accesses the block of eight 36 bit words containing the requested data element during time t2 at time line 111.

The availability of the eight word block of data is acknowledged by the storage controller during time line 112. The acknowledge is captured by the instruction processor during time line 114. The data block is actually transferred as 72 bit parallel double words. The first double word is transferred during time line 116. The second double word is transferred during time line 118. Similarly, the third and fourth double words are transferred during time lines 120 and 122, respectively.

The instruction processor receives the 72 bit double words at time lines 124, 126, 128, and 130, respectively. In prior art systems, the four 72 bit double words are loaded as eight 36 bit words into the corresponding cache memory. After the eight word data block has been loaded, the instruction processor completes execution of the instruction during time t9 as shown by time line 108. Therefore, in accordance with the prior art systems, a total of ten representative clock cycles may be needed to execute an instruction, because of the wait required to completely load the cache with the cache miss data block. This wait may be on the order of seven or eight clock cycles.

Figure 4:
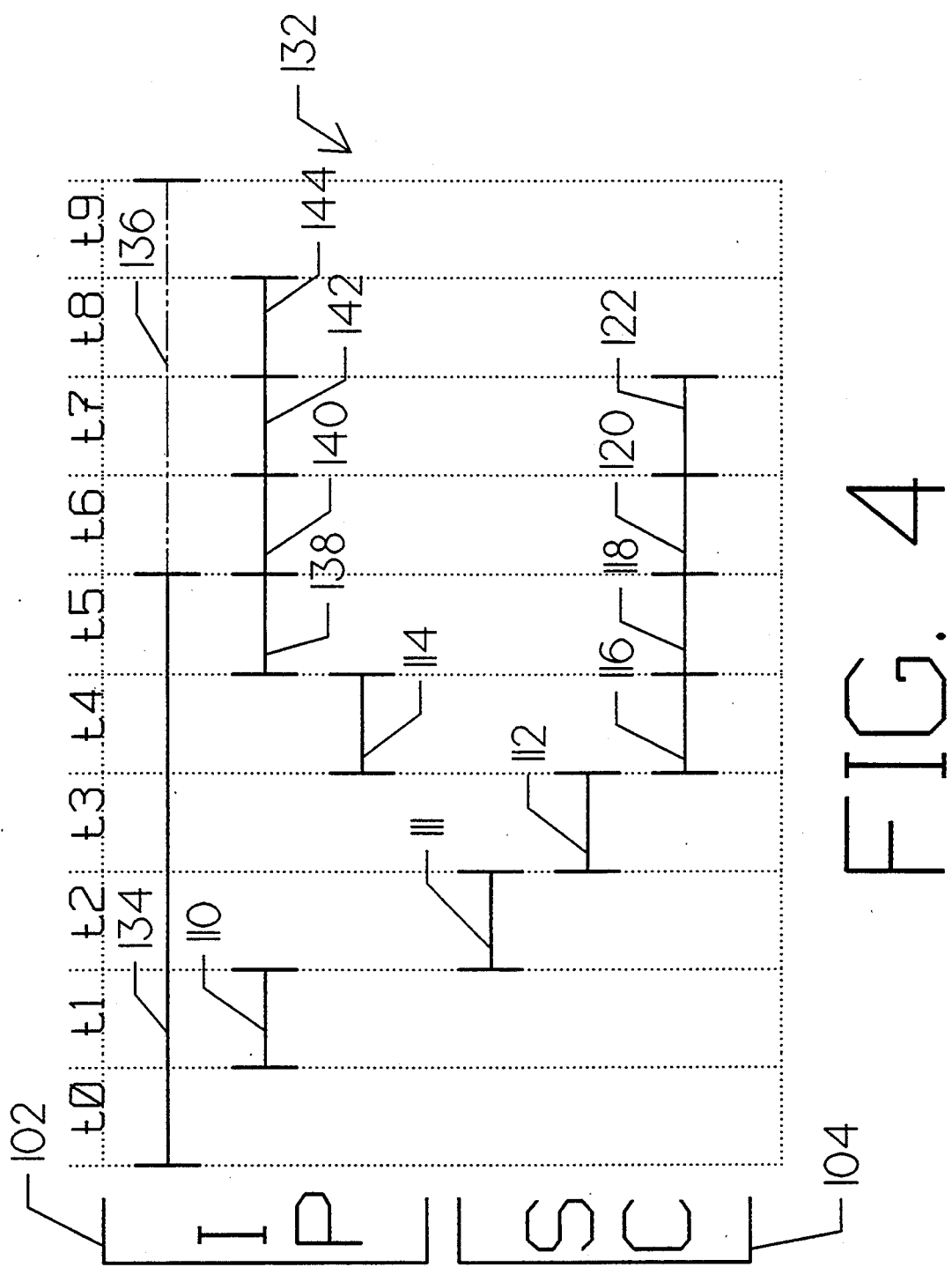
FIG. 4 is a timing diagram showing maximum performance enhancement of the present invention.

FIG. 4 is a timing diagram 132 for the execution of a cache miss instruction according to the present invention. The instruction begins execution at time t0 along time line 134. Because of the cache miss, an access request is directed from the instruction processor to the storage controller along time line 110. The request is acknowledged along time line 112. As in the prior art system, the transfer proceeds along times line 116, 118, 120, and 122 as explained above.

However, in accordance with the present invention, the first 72 bit double word to be transferred at time line 116 is the one containing the requested data element. This means that the requested data element is stored in the block buffer at time line 138 and immediately available for instruction execution at that point.

The remaining 72 bit double words are transferred from the storage controller along time lines 118, 120, and 122, resulting in storage in the block buffer at time lines 140, 142, and 144, respectively. Note that these transfers are not, therefore, necessarily sequential. In the preferred mode, the data block is transferred from the 72 bit double word containing the requested cache miss data element sequentially to the end of the eight word block and then "end around" to transfer the first 72 bit double words in the eight word block.

The result is that execution of the cache miss instruction is completed at the end of time t5 (i.e. end of time line 134). The savings over the prior art technique is potentially all of time line 136. This is the maximum savings available and assumes that the next several accesses of the instruction processor are available in the respective instruction and operand cache memories or within the corresponding cache buffers.

If the next accesses are to the data block within the block buffer, the request is satisfied directly from the block buffer, and it is not necessary to hold the instruction processor until the block transfer to the corresponding cache is complete. However, another cache miss to a different data block results in a transfer of the contents of the block buffer to the cache memory during the loading of the more recent cache miss data block into the block buffer.

Figure 5:
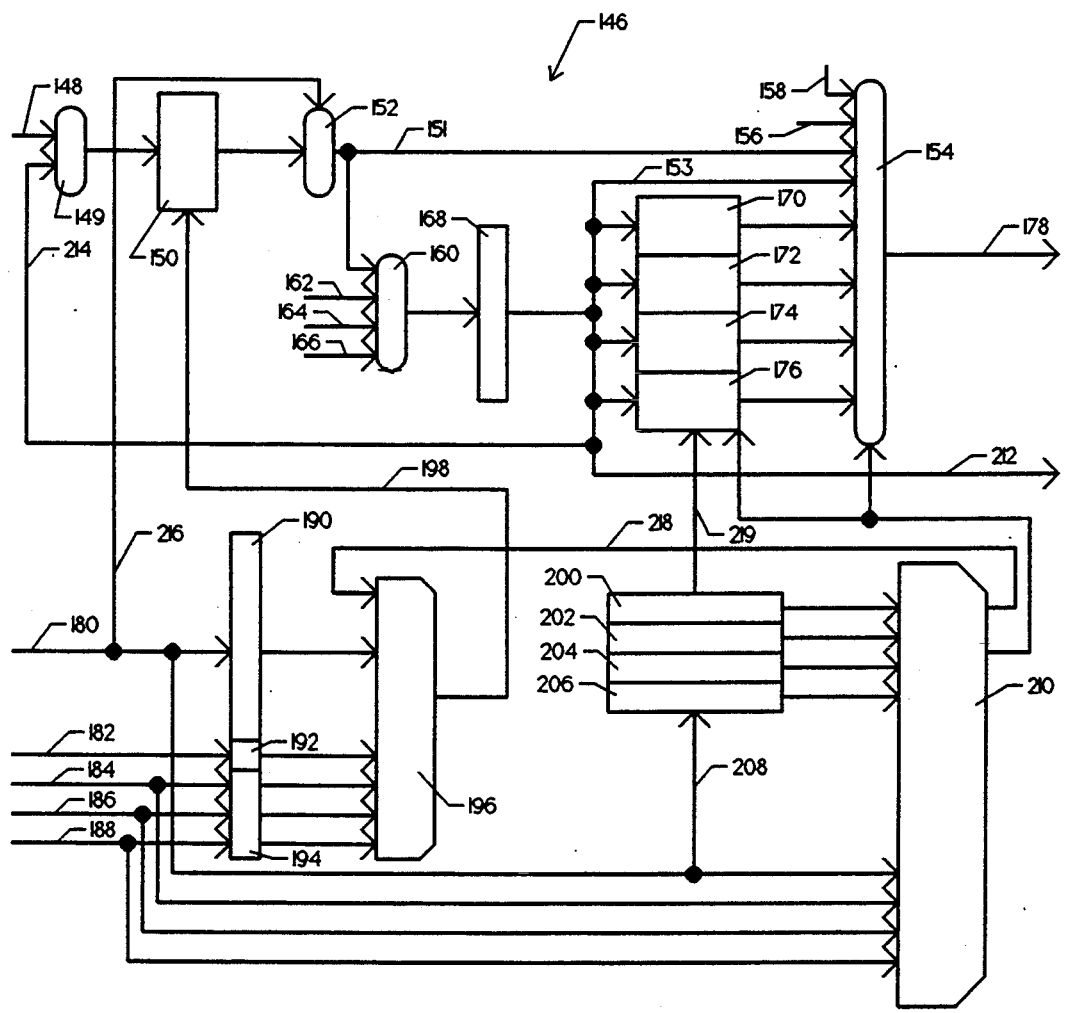
FIG. 5 is a block diagram of the cache buffer control circuitry.

FIG. 5 is block diagram 146 showing a preferred implementation of the present invention. Shown are the circuit elements for the operand block buffering functions. The instruction block buffering hardware is similar except that only those circuit elements associated with read accesses are needed. The basic hardware elements are explained followed by several examples.

Following completion of the read operation, the requested data element is provided to the arithmetic control circuit (or instruction decoder) by cable 178. Selector 154 selects the data element to be provided from its inputs, which include: special inputs from cable 158; general register set (GRS) inputs received via cable 156; arithmetic section inputs from input register 168; operand (or instruction) cache storage data from one of blocks 170, 172, 174, or 176; and data from the eight 36 bit words of operand cache buffer 150 received via cable 151. It is the availability of cable 151 from operand block buffer 150 at selector 154 which provides the instruction processor with access to the requested cache miss data element at the earliest possible time (i.e. before the entire eight word block containing the requested data element has been received from the storage controller).

Operand cache blocks 170, 172, 174, and 176 each contain 2 k words of 36 bits each. Each block is set associatively addressed via cable 219 from operand tag blocks 200, 202, 204, and 206. Each of these operand tag blocks contains the addresses for valid entries in a corresponding one of the operand cache blocks. Further information concerning the operand tag blocks is available in commonly assigned, co-pending U.S. patent application Ser. No. 07/762,276, filed Sep. 19, 1991, entitled, "Data Coherency Protocol for Multi-Level Cached High Performance Multiprocessor System", incorporated herein by reference.

The absolute address of the data request is received via cable 180. This absolute address is supplied to operand tag blocks 200, 202, 204, and 206 for requested data elements located within one of the four operand cache blocks 170, 172, 174, and 176. This read address is also transferred to selector 152 to enable the requested data element, if located within operand block buffer 150. The actual selection of the location within operand block buffer 150 is performed via cable 198 from operand block buffer tag block 190, which performs the same functions for operand block buffer 150 as is performed by the four operand tag blocks for the four operand cache blocks.

Control logic 210 controls both reading from and writing into operand cache blocks 200, 202, 204, and 206, as well as controlling the selection of the read data output of selector 154. Similarly, control logic 196 controls reading from and writing into operand block buffer 150. Communication between these two control logic circuits is via cable 218.

Control signal inputs include: the operand interpretation partial word control, "J" field received via cable 188; the write request received via line 186; the read request received via line 184; and the "save/no save" designator received via line 182. The first three of these control signals are buffered by logic element 194. The save/no save designator is stored in logic element 192. It is the save/no save designator which permits operand block buffer 150 to be utilized for block transfers without ever subsequently writing the data into the operand cache.

The read data which is fetched from the storage controller as a result of a cache miss is received via cable 148. After selection by selector 149, it is loaded into operand block buffer 150. Selector 149 may also select write data from cable 214. In this way, operand block buffer 150 is used for block transfers of data without disturbance to the operand cache contents. This requires a no save designation be sent on line 182 to logic element 192.

The write data inputs received by selector 160 include: the output of operand block buffer 150 received via cable 151; data from the arithmetic section received via cable 162; data from the control section received via cable 164; and constants received via cable 166. The output of selector 160 is temporarily stored in input register 168. The cable 153 provides write data by-pass for cache write conflict cases. The write data is supplied to selector 154, the four operand cache blocks (i.e. 170, 172, 174, and 176), selector 149 via cable 214, and the write output queue for transfer to the storage controller via cable 212.

EXAMPLE 1—READ HIT

To initiate an operand read request, the instruction processor places the absolute address on cable 180, along with a read request control signal on line 184. Control logic 210 determines whether the requested data element is validly located within the operand cache by the outputs of tag blocks 200, 202, 204, and 206, and if present, which of operand cache blocks 170, 172, 174, or 176 contains the requested data element. Assuming that the requested data element is present within the operand cache, control logic 210 causes selector 154 to select the requested data element as it is read from the associated operand cache block and transfers the requested data element along cable 178 for instruction execution.

EXAMPLE 2—BLOCK BUFFER HIT

A similar situation occurs when the read data request receives a hit within the operand block buffer rather than the cache memory itself. The read request is presented on line 184 and the absolute address is placed on cable 180 as before. A hit within the operand block buffer is determined by control logic 196 from the report of operand block tag buffer block 190. Access to operand block buffer 150 is addressed by cable 198 from control logic 196. The requested data element is accessed from operand block buffer 150, enabled by selector 152, and selected by selector 154 for transfer via cable 178 as before.

EXAMPLE 3—READ MISS

If the address presented on cable 180, along with the read request on line 184, is not found in operand block tag buffer block 190 or any of the four cache tag blocks, 170, 172, 174, or 176, a cache miss condition occurs. This causes control logic 210 to generate a read miss signal which indicates to the storage controller (not shown) that a cache miss has occurred and the eight word block containing the requested data element is to be transferred to the instruction processor. This transfer occurs from the two word location containing the requested data element as explained in more detail below.

A cache miss condition is also indicated to operand block buffer 150 by control logic 210. This causes the current eight word block stored within operand block buffer 150 to be read into the cache memory to provide room within operand block buffer 150 to receive the eight word block to be transferred from the storage controller. This transfer is via selector 152, selector 160 and input register 168, which all must be controlled by control logic 210. Because this transfer requires less time and overlaps the access of the requested data element from the storage controller, no additional instruction processor wait time is incurred.

EXAMPLE 4—READ WITH NO SAVE

When a read request is present on line 184 along with a no save designation on line 182, the data is captured in the operand block buffer 150 without subsequently being written into operand cache. This read operation means that data which is not likely to be soon accessed does not displace any data currently present in the operand cache. This function is, of course, not utilized within the instruction cache circuitry.

Figure 6:
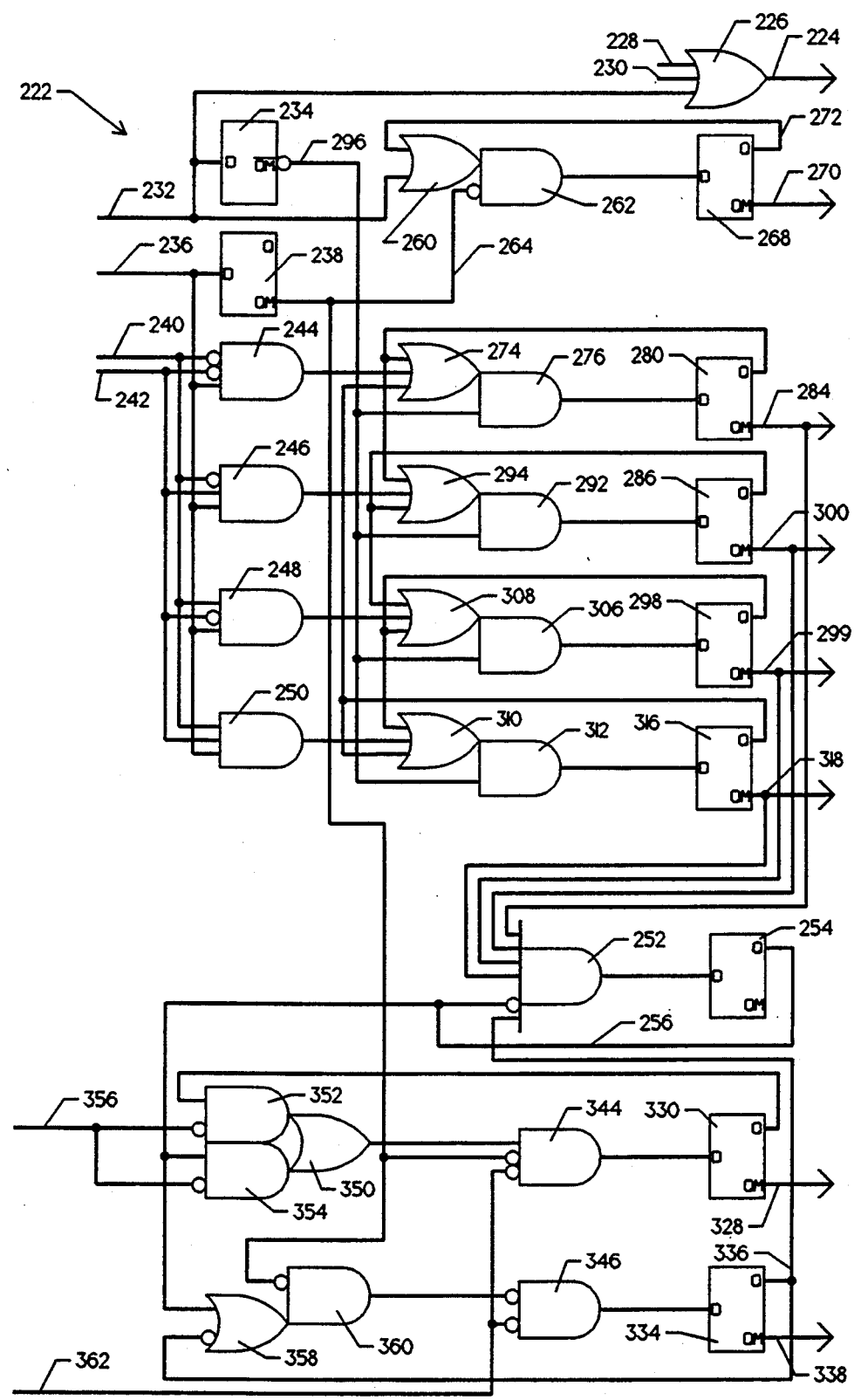
FIG. 6 is a schematic diagram showing loading of the cache miss data block from the requested address.

FIG. 6 is a schematic diagram 222 of the circuitry within the instruction processor which ensures that the eight word block transfer from the storage controller to the instruction processor will begin with the 72 bit double word containing the requested data element. The cache read miss signal is received via line 232 (see above for a discussion of the formation of the cache miss signal). The signal is supplied to gate 226 and transmitted to the storage controller for access to the second level shared cache or for access to a main memory module as required. Input 228 and 230 correspond to other storage controller read requests which are not pertinent to the present discussion.

The cache read miss signal is also used to set flip-flop 234 which provides a clear via line 296 for the initialization of the read data capture control. The read acknowledge signal from the storage controller (see also FIGS. 3 and 4) is presented at line 236. This read acknowledge signal is used to enable the data received from the storage controller/instruction processor interface into the appropriate block buffer for storage and into gates 244, 246, 248, and 250 for the first double word capture control. The storage controller read acknowledge signal is also latched by flip-flop 238. Its output on line 264 is used with gate 260, gate 262, and flip-flop 268 to generate the instruction processor wait signal placed on line 270; line 232 initiates instruction processor wait, and line 264 terminates it.

Line 242 has impressed upon it the least significant bit plus one (lsb+1) of the address of the 72 bit double word currently present on the storage controller/instruction processor interface. Line 240 contains the lsb+2. Gate 244, gate 274, gate 276, and flip-flop 280 produces a control signal on line 284 if the address corresponds to the "0th" and "1st" words of the accessed block of data. Similarly, gate 246, gate 294, gate 292, and flip-flop 286 produce a control signal on line 300 if the address corresponds to the second and third words of the accessed data block. Gate 248, gate 308, gate 306, and flip-flop 298 produce the fourth and fifth word control signal on line 299. Similarly, gate 250, gate 310, gate 312, and flip-flop 316 produce the sixth and seventh word control signal on line 318. These four control signals (i.e. on lines 284, 300, 299, and 318) control the transfer of the four 72 bit double words such that the transfer can proceed from the 72 bit double word containing the requested data element rather than sequentially from the first entry in the eight word block.

Because these four control signals are latched by the respective flip-flops (i.e. flip-flops 280, 286, 298, and 316), gate 252 can be enabled after all four 72 bit double words have been transferred. This latches flip-flop 254 disabling gate 252 and completing the transfer sequence via line 256. Lines 356 and 362 contain the invalid signals for interrupting the read process and invalidating the block buffer by other units. These two signals are used, along with gates 350, 352, 354, 344, 358, 360, and 346 and flip-flops 330 and 334 to control toggling of the read buffer valid designation signal placed on line 328 and the read buffer block capture window signal placed on line 338. These are the hand shaking signals which control transfer of the requested read data across the storage controller/instruction processor interface.

Having thus described the preferred embodiments in sufficient detail for those of skill in the art to make and use the present invention, those of skill in the art will be readily able to apply the teachings found herein to yet other embodiments within the scope of the claims hereto attached.

We claim:

1. A data processing system comprising:
  a. a main memory;
  b. an instruction processor;
  c. an instruction cache memory coupled to said instruction processor for holding a plurality of blocks of instructions;
  d. an instruction buffer coupled to said main memory and said instruction cache memory for storing one of said plurality of blocks of instructions;
  e. an operand cache memory coupled to said instruction processor for holding a plurality of blocks of operands;
  f. an operand buffer coupled to said main memory and said operand cache memory for storing one of said plurality of blocks of operands;
  g. an instruction control means coupled to said main memory and said instruction buffer for transferring said one of said plurality of blocks of instructions from said main memory to said instruction buffer when a first instruction cache miss occurs;
  h. said instruction control means includes means for transferring said one of said plurality of blocks of instructions beginning with said requested instruction; and
  i. an instruction cache loading means for loading said one of said plurality of blocks of instructions from said instruction buffer into said instruction cache memory when a second instruction cache miss is detected.

2. A data processing system according to claim 1 wherein said instruction buffer further comprises a no save designator for preventing said instruction cache loading means from loading a particular one of said plurality of blocks of instructions into said instruction cache memory from said instruction buffer.

3. A data processing system according to claim 2 further comprising an operand control means coupled to said main memory and said operand buffer for transferring said one of said plurality of blocks of operands from said main memory to said operand buffer when a first operand cache miss occurs.

4. A data processing system according to claim 3 wherein said operand control means includes means for transferring said one of said plurality of blocks of operands beginning with said requested operand.

5. A data processing system according to claim 4 further comprising an operand cache loading means for loading said one of said plurality of blocks of operands from said operand buffer into said operand cache memory when a second operand cache miss is detected.

6. A data processing system according to claim 5 wherein said operand buffer further comprises a no save designator for preventing said operand cache loading means from loading a particular one of said plurality of blocks of operands into said operand cache memory from said operand buffer.

7. A method of supplying an operand and an instruction from a main memory to an instruction processor upon request comprising:
  a. determining if the instruction processor is requesting an operand;
  b. determining if the instruction processor is requesting an instruction;
  c. searching the present contents of an instruction cache memory to determine whether said requested instruction is present in said instruction cache memory if the determining step determined that the instruction processor is requesting an instruction;
  d. supplying said requested instruction to said instruction processor if said requested instruction is present in said instruction cache memory if the determining step determined that the instruction processor is requesting an instruction;
  e. searching the present contents of an instruction cache buffer to determine whether said requested instruction is present in said instruction cache buffer if the determining step determined that the instruction processor is requesting an instruction;
  f. supplying said requested instruction to said instruction processor if said requested instruction is present in said instruction cache buffer and if the determining step determined that the instruction processor is requesting an instruction;

g. requesting a block of instructions containing said requested instruction from a shared memory if said requested instruction is not present in either said instruction cache memory or said instruction cache buffer and if the determining step determined that the instruction processor is requesting an instruction;

h. loading said block of instructions into said instruction cache buffer thereby overwriting the present contents of said instruction cache buffer if the determining step determined that the instruction processor is requesting an instruction;

i. searching the present contents of an operand cache memory to determine whether said requested operand is present in said operand cache memory if the determining step determined that the instruction processor is requesting an operand;

j. supplying said requested operand to said instruction processor if said requested operand is present in said operand cache memory if the determining step determined that the instruction processor is requesting an operand;

k. searching the present contents of an operand cache buffer to determine whether said requested operand is present in said operand cache buffer if the determining step determined that the instruction processor is requesting an operand;

l. supplying said requested operand to said instruction processor if said requested operand is present in said operand cache buffer and if the determining step determined that the instruction processor is requesting an operand;

m. requesting a block of operands containing said requested operand from a shared memory if said requested operand is not present in either said operand cache memory or said operand cache buffer and if the determining step determined that the instruction processor is requesting an operand;

n. loading said block of operands into said operand cache buffer thereby overwriting the present contents of said operand cache buffer if the determining step determined that the instruction processor is requesting an operand; and o. transferring the present contents of said instruction cache buffer to said instruction cache memory during said requesting step (f) and loading step (g) if an instruction cache miss is detected.

8. A method according to claim 7 wherein said requesting step 6(f) and loading step 6(g) begin with a data element containing said requested instruction.

9. A method according to claim 8 further comprising:
a. supplying said requested instruction to said instruction processor from said shared memory as soon as said requested instruction is loaded into said instruction cache buffer via the loading step 6(g); and
b. permitting said instruction processor to resume instruction execution after completion of said supplying step 9(a) even if said requesting step 6(f) and said loading step 6(g) are not complete.

10. A method according to claim 9 further comprising:
a. indicating a no save designation for predetermined instructions within said instruction cache buffer; and
b. preventing said transferring step 7(a) as to said predetermined instructions designated no save.

11. A method according to claim 10 further comprising:
a. transferring the present contents of said operand cache buffer to said operand cache memory during said requesting step 6(l) and loading step 6(m) if an operand cache miss is detected.

12. A method according to claim 11 wherein said requesting step 6(l) and loading step 6(m) begin with a data element containing said requested operand.

13. A method according to claim 12 further comprising:
a. supplying said requested operand to said instruction processor from said shared memory as soon as said requested operand is loaded into said operand cache buffer via the loading step 6(m); and
b. permitting said instruction processor to resume operand execution after completion of said supplying step 25(a) even if said requesting step 6(l) and said loading step 6(m) are not complete.

14. A method according to claim 13 further comprising:
a. indicating a no save designation for predetermined operands within said operand cache buffer; and
b. preventing said transferring step 23(a) as to said predetermined operands designated no save.

* * * * *